3,300,406
FLOCCULATION OF WATER-SOLUBLE ORGANIC MATERIALS
Francis X. Pollio, Philadelphia, Pa., assignor to Rohm & Haas Company, Philadelphia, Pa., a corporation of Delaware
No Drawing. Filed Nov. 18, 1964, Ser. No. 412,246
13 Claims. (Cl. 210—52)

The present invention is concerned with the clarification of aqueous media, and more particularly with the removal of anionic water-soluble materials from various aqueous media, such as river waters polluted by anionic detergents, decay products, and by-products occurring in industrial wastes discharged into surface waters flowing through areas occupied by domestic and industrial installations. It is also concerned with the clarification of such aqueous media which contain not only anionic detergents but also turbidity-producing and discoloring components, such as colloidal silt particles, such as of clays, and minute forms of plant life and animal micro-organisms, such as of algae and bacteria.

Most of the naturally occurring organic substances are large complex molecules. Though poorly characterized, they are found to be rich in oxygen containing compounds, carboxylics, and other active complex constituents such as humins, ulmins, polyphenols and may include acids of the crenic and apocrenic types. A large portion of the organic compounds are color imparting materials and are not usually eliminated with any great facility through normal sedimentation or filtration practices. The organic compounds commonly found in colored waters are broadly classified and placed under two not too well delineated categories, the humic and fulvic acids. Included under the humic acid class materials are substances precipitated upon treatment with mineral acids from an alkali extract of soil. When reconstituted, the humic acid solutions acquire a characteristic deep brown coloration. Fulvic acids comprise the class of organic substances dissolved in the acid soluble phase when an alkali extract of soil is subsequently treated with mineral acids. At dilute concentrations, fulvic acid solutions are characteristically distinguishable from the humic acids by their yellow color.

Such river waters may need clarification in order to prepare them for drinking purposes, for use in boilers, or for other industrial uses, e.g., in chemical manufacturing operations. Treatments are known that can efficiently flocculate suspended water-insoluble matter of either organic or inorganic types. Ion-exchange resins are quite commonly used to remove anions and cations. However, when many anionic water-soluble materials, such as carboxylate, phosphate, sulfate or sulfonate type detergents, humic and fulvic acids, and alkali metal lignin sulfonates, are present in a water which must be deionized by treatment with ion-exchange resins, the latter resins are quickly fouled by these water-soluble materials which are picked up and held irreversibly by the ion-exchange resins so that their efficiency for removal of other ions is severely reduced rapidly and permanently. Removal of these water-soluble materials is also desirable to eliminate the tendency of the aqueous medium to foam.

It is the primary object of the present invention to provide an efficient flocculant for the aforementioned water-soluble anionic materials which is capable of removing them even when they are present in low concentrations in the aqueous medium being treated. Another object is to remove not only anionic detergents but also turbidity-producing and discoloring components.

In accordance with the present invention, it has been discovered that water-soluble anionic materials in an aqueous medium containing from about 0.2 to 200 or more parts per million (p.p.m.) thereof can be flocculated, and thereby rendered amenable to partial or practically complete removal by such processes as filtration, centrifugation, and sedimentation with decantation, by the addition to the medium at a temperature from room temperature up to just below the boiling point of the medium of 0.01 to 60,000 p.p.m. and preferably 0.01 to 1% by weight, based on the weight of the aqueous medium, of a water-soluble polymer, or a salt thereof, having a high molecular weight from about 20,000 to 10,000,000, viscosity average, and having an exclusively carbon-atom "backbone" chain to which there are attached a plurality of nitrogenous rings of the formula

(I)

wherein
A is an alkylene group having from 2 to 6 carbon atoms, of which 2 to 3 only extend in a chain between the adjoined N atoms, and
R is selected from the group consisting of H, $(C_1-C_6)$-alkyl, cyclohexyl, hydroxyl-substituted $(C_1-C_6)$alkyl groups and groups of the formula $-(ANH)_xH$ wherein A is as defined above and $x$ is an integer having a value of 1 to 4.

If desired, the steps of adding the polymer to flocculate anionic materials and then removing the flocculate as by filtration or the like may be repeated to effect a greater purification of the aqueous medium.

The exact proportion of polymer needed depends on the nature of the aqueous medium, the content of silt, anionic detergent, etc., the particular nature of these contents, and also the effect desired. In general, the polymer must be used at least in the amount corresponding to the minimum of 0.01 p.p.m. to obtain a noticeable improvement. On the other hand, it may generally be used in amounts greater than the maximum, if desired, though the use of such large amounts ordinarily is not accompanied by commensurate improvement in results.

The treatment in accordance with the present invention is effective in acid, neutral, and alkaline waters over a wide pH range, such as from about 2 to 10.5. Preferred results are obtained in the pH range of about 2 to 8.

In a modification, there may be added to the water containing the anionic water-soluble material a mixture of (1) an inorganic water-insoluble absorbent material in the form of finely-divided particles of a size in the range of 0.01 micron to 100 microns and (2) a water-soluble polymer as defined above.

The proportion of the inorganic material (1), when used, may be in the range of 0.01 to 1,000 p.p.m. of the aqueous medium and the ratio of the inorganic material to the water-soluble polymer may be in the range of 1:1 to 100:1, and preferably in the range from 1:1 to 30:1.

The inorganic material (1) may be any water-insoluble siliceous material, such as silica or a silicate, and especially the clays, such as attapulgite, kaolin, fuller's earth, montmorillonite, or bentonite, and the diatomaceous earths. The inorganic material should be relatively water-insoluble (i.e., having a solubility in water at 20° C. and at the pH of the water to be treated which does not exceed 0.01 g./100 g. of water) and carry a negative electrokinetic charge (zeta potential).

In the water-soluble polymer, the nitrogenous rings of Formula I may be connected directly to carbon atoms in the polymer chain or they may be connected through a phenylene group or through an ester or amide linkage. Thus, the typical polymerized unit of the polymers used in carrying out the present invention may in most cases be represented generically by the following formula $$-H_2C-C(R')- \atop (Y)_{m-1}-C{\left<{N \atop N \atop R}\right.}A \quad (II)$$

wherein

A and R are as defined hereinbefore,

R' is selected from the group consisting of H and $(C_1-C_2)$-alkyl, phenyl, $C_7$-alkaryl, and $$-C{\left<{N \atop N \atop R}\right.}A$$

m is an integer having a value of 1 to 2 and,

Y is selected from the group consisting of phenylene, $$O=\overset{|}{C}-O-Z- \quad \text{and} \quad O=\overset{|}{C}-NH-Z-$$

wherein Z is a $(C_1-C_4)$-alkylene group.

The preferred polymers are those in which each unit of Formula II contains only 5 to 8 carbon atoms, and optimum results are obtained with polymers in which such units contain only 5 carbon atoms, that is units of 2-vinylimidazoline-2.

To assure water-dispersibility of the polymers, the number of carbon atoms in each unit of Formula II should not exceed 12 carbon atoms. In general, the polymers used in accordance with the present invention contain at least 40 mole percent of units of Formula II and preferably about 90 to 100 mole percent thereof.

Preferred polymers are those containing 50 to 100 mole percent of units of the formula $$-H_2C-C(R')-C{\left<{N \atop NH}\right.}A \quad (III)$$

wherein

R' is selected from the group consisting of H and $CH_3$ and

A is a $(C_2-C_3)$-alkylene group having at least 2 carbon atoms extending in a chain between adjoined N atoms. Preferred species include the polymers containing 50 to 100 mole percent of units of the formula $$H_2C-CH-C{\left<{N-CH_2 \atop NH-CH_2}\right.} \quad (IV)$$

which contain 2-imidazoline groups, or of the formula $$-H_2C-CH-C{\left<{N-CH_2 \atop NH-CH_2}{CH_2 \atop}\right.} \quad (V)$$

which contain 3,4,5,6-tetrahydropyrimidine groups, or of the formula $$-H_2C-CH-C{\left<{N \atop NH}\right.}A \quad (VI)$$

in which A is the propylene group $$(-CH_2-CH(CH_3)-)$$

and which contain C-methyl-substituted imidazoline-2 groups, or more specifically 4(or 5)-methyl-2-imidazoline groups.

The polymers containing units of Formula II are obtained by reacting, in the ways disclosed in copending U.S. application for patent Serial No. 254,585, filed January 29, 1963 (in the hands of a common assignee), an amine of the Formula VII with a polymer of a nitrile-containing monomer.

$$HN(R)-(ANH)_xH \quad (VII)$$

wherein

R, A, and x are as defined hereinbefore. Examples of the amines include ethylenediamine
propylenediamine (i.e., 1,2-propanediamine)
trimethylenediamine (i.e., 1,3-propanediamine)
N-methyl-ethylenediamine
N-butyl-ethylenediamine
N-cyclohexyl-ethylenediamine
N-hydroxyethyl-ethylenediamine
N-(2-hydroxypropyl)-propylenediamine
diethylenetriamine
dipropylenetriamine
di-(trimethylene)-triamine
triethylenetetraamine
tetraethylenepentamine The polymers to be reacted with the amine of Formula VII include the homopolymers and copolymers of any polymerizable ethylenically unsaturated monomer containing at least one nitrile group. Examples of these monomers include acrylonitrile
methacrylonitrile
vinylidene cyanide
1-cyanomethyl acrylate and methacrylate
1-cyanoethyl acrylate and methacrylate
2-cyanoethyl acrylate and methacrylate
1-cyanopropyl acrylate and methacrylate
2-cyanopropyl acrylate and methacrylate
3-cyanobutyl acrylate and methacrylate
N-(1-cyanomethyl)-acrylamide and -methacrylamide
N-(2-cyanoethyl)-acrylamide and -methacrylamide
N-(1-cyanopropyl)-acrylamide and -methacrylamide
N-(2-cyanobutyl)-acrylamide and -methacrylamide
α-cyanostyrene
o-cyanostyrene
m-cyanostyrene
p-cyanostyrene
p-methyl-α-cyanostyrene
p-methyl-o-cyanostyrene
o-methyl-p-cyanostyrene
1-cyanobutadiene
2-cyanobutadiene
methyl α-cyanoacrylate
butyl α-cyanoacrylate
N-(2-cyanoethyl)-acrylamide
N-(2-cyanoethyl)-α-cyanoacrylamide
N-(2-cyanoethyl)-methacrylamide The method of preparation of the polymeric deposition aids of the present invention, is not per se claimed as part of the present invention. The disclosure of Serial No. 254,585 in regard to the making of these polymers is incorporated herein by reference.

It is essential that the polymer salts to be used as deposition or flocculation aids be of water-soluble character. This term is meant to include both true solubility as well as that type of dispersibility in water characteristic of high molecular weight molecules, such as result in the so-called colloidal solutions or dispersions. The most efficient polymer salts are generally those having the highest hydrophilicity. The product obtained by reacting polyacrylonitrile of a molecular weight in the range of 500,000 to 10,000,000 viscosity average with at least an amount of ethylenediamine equivalent to the nitrile groups of the polymer so that the nitrile groups are replaced by imidazoline groups constitutes a preferred species.

However, any water-soluble salt of a polymer containing units of Formula II having a molecular weight in the range of about 10,000 to about 20,000,000 is capable of serving the purposes of the invention. The nitrile-containing polymer from which the flocculation aid is obtained may thus be a copolymer of the unsaturated nitrile-containing monomer with up to 40 mole percent (or sometimes even up to 50 mole percent) of vinyl esters of fatty acids, such as vinyl acetate, vinylaromatic hydrocarbons, such as styrene and vinyltoluenes, esters of acrylic or methacrylic acid with a saturated aliphatic alcohol having 1 to 18 carbon atoms, such as ethyl acrylate, butyl acrylate, or methyl methacrylate. The nitrile-containing monomer may be copolymerized with hydrophilizing monomers, such as acrylamide, methacrylamide, N-methylolacrylamide, β-hydroxyethyl acrylate, 4-vinylpyridine, dimethylaminoethyl methacrylate, and glycidyl acrylate. Such monomers may compensate for the tendency of other monomers or of hydrophobic constituents of the units of Formula II to reduce the water-dispersibility of the polymeric flocculation aid.

All of the nitrile groups in the nitrile-containing polymer are converted into groups of Formula I.

The acids that may be used to convert the polymer containing units of Formula II to the salt form may be any organic or inorganic acid or acid salt. The acid is preferably a strong acid. Examples include hydrochloric, hydrobromic, hydroiodic, sulfuric, ammonium sulfate, sodium bisulfate, potassium bisulfate, monomethyl hydrogen sulfate, sulfurous, sodium bisulfite, sulfonic, benzene sulfonic, p-toluene sulfonic, phosphoric, sodium acid phosphates, nitric, acetic, oxalic, propionic, tartaric, citric, sulfamic, glycolic, diglycolic, ethylenediaminetetraacetic.

The term salt herein is intended to embrace not only the ordinary salts formed with acids, such as those just mentioned, but also such quaternary ammonium salts formed by quaternizing the NR groups of one or more of the units of Formula II in the polymer as are still water-soluble. Alkylating agents which do not detrimentally affect the water-solubility of the polymers are preferably used, such as methyl chloride, methyl bromide, ethyl chloride, dimethyl sulfate, dimethyl sulfite, and dimethyl phosphate. The alkylation may be effected by heating a mixture of the polymer and the alkylating agent in a suitable solvent and, if necessary, under pressure (as in the case of methyl bromide) at a temperature of 40 to 130° C., such as at reflux at the pressure used. Suitable solvents include alcohols, such as absolute ethanol, and isopropanol, acetonitrile, dimethylformamide, and nitropropane. The mixture may be heated for a half hour or more depending on the temperature and the extent of alkylation desired.

For some purposes, a modified embodiment of the invention may be preferred in which the flocculation composition comprises, in addition to the inorganic material and the water-soluble polymer a common coagulant as a third component, namely a polyvalent metal salt of a strong mineral acid, such as ferric sulfate or chloride, aluminum sulfate or chloride, alum, chromium sulfate, chrome alum, and analogous salts of nickel, cobalt, zinc, and manganese. The most widely used coagulants are aluminum or iron salts of either sulfuric or hydrochloric acid. Aluminum sulfate, $Al_2(SO_4)_3$ (sometimes designated as filter alum), is still the most widely used coagulant. Ferrous sulfate, $FeSO \cdot 7H_2O$ (known as copperas), is also used to a great extent. Ferric sulfate, $(Fe_2(SO_4)_3)$ (sometimes known as "ferrifloc" or "ferrisul"), ferric chloride $FeCl_3 \cdot 6H_2O$, and sodium aluminate, $Na_2Al_2O_4$, are also employed as coagulants. The amount of this metal salt coagulant when used is from about 1 p.p.m. to about 1,000 p.p.m. or more based on total weight of solution being treated.

When the water is to be treated by both a finely divided water-insoluble negatively charged inorganic material and the water-soluble polymer, these two components may be added to the water simultaneously or in either order, but preferably the inorganic material is added before adding the polymer. When the treatment also involves the use of a common coagulant, all three components may be added simultaneously or they may be added in any order. However, in this embodiment it is preferred to add the coagulant first, the polymer second and water-insoluble inorganic material last.

The waters treated may include river waters into which anionic detergents have been introduced by discharge from domestic or industrial sewerage systems, especially from laundries. There may also be treated the streams into which paper mill effluents containing alkali metal lignin sulfonates have been discharged. The treatment of the present invention is also quite advantageously applied to river waters containing humic and fulvic acids derived from natural sources, such as from rotting plant growth. All of such waters may contain silt, algae, bacteria, and other microorganisms. The amount of water-soluble anionic material in the water treated may be as high as 10,000 p.p.m. or even as low as 0.2 p.p.m. The present invention is especially noteworthy in its ability to remove these water-soluble materials efficiently even at the low concentrations mentioned.

The "waters" or aqueous media that may be effectively treated in accordance with the present invention includes any such aqueous medium containing an objectionable amount of such anionic materials as are mentioned hereinabove. Typical anionic detergents that may be present in the aqueous medium that is treated include the following:

(1) The soluble metal (especially the alkali metal and alkaline earth metal (of Group II of the Periodic Table)) salts of alkaryl sulfonates especially those in which the aryl group is a benzene or naphthalene ring containing from one to four alkyl substituents each having from 4 to 24, and preferably 8 to 18 carbon atoms and preferably having a total of 8 to 18 carbon atoms in the alkyl portion of the compound. Preferred compounds of this group are those of the Formula VIII.

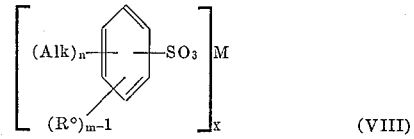

(VIII)

wherein $n$ is an integer having a value of 1 to 3,

Alk is an alkyl group, $(Alk)_n$ contains 8 to 24 carbon atoms, $R°$ is selected from the group consisting of OH and $CH_3$, $m$ is an integer having a value of 1 to 2, M is selected from the group consisting of alkali metals and alkaline earth metals, and $x$ is the valence (1 or 2) of the metal M. The metals M are ordinarily sodium, potassium, calcium, or magnesium. Specific examples include the water-soluble metal salts of: di-butyl benzene monosulfonic acid; mono-lauryl benzene mono-sulfonic acid, mono-lauryl xylene monosulfonic acid, mono-lauryl toluene monosulfonic acid, mono-lauryl phenol monosulfonic acid; dioctyl benzene monosulfonic acid; mono-nonyl phenol monosulfonic acid; mono-myristyl benzene monosulfonic acid; dinonyl benzene monosulfonic acid; isododecyl benzene mono-sulfonic acid; mono-stearyl benzene monosulfonic acid; tri-isopropyl benzene mono-sulfonic acid; mono-stearyl-mono-lauryl benzene disulfonic acid.

(2) Soluble metal salts of long-chain fatty alcohol sulfates, such as the sulfates of aliphatic alcohols having 8 to 24, and preferably 12 to 18, carbon atoms. Typical examples include the sodium, potassium, calcium or magnesium salts of lauryl sulfate, palmityl sulfate, myristyl sulfate, cetyl sulfate, oleyl sulfate, and stearyl sulfate.

(3) Soluble metal salts of dialkyl sulfosuccinates in which the alkyl groups contain from 4 to 18 carbon atoms. Typical examples include the sodium, lithium, calcium and magnesium salts of dibutyl sulfosuccinate; diamyl sulfosuccinate, dihexyl sulfosuccinate, dioctyl sulfosuccinate, and dioctadecyl sulfosuccinate.

(4) Soluble metal salts of the following general Formulas IX and X

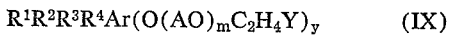

$$R^1R^2R^3R^4Ar(O(AO)_mC_2H_4Y)_y \quad (IX)$$

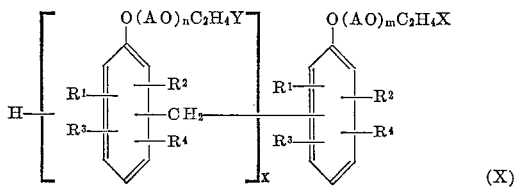

where

Ar is a benzene or naphthalene nucleus, but is preferably a benzene nucleus, $R^1$ is a hydrocarbon substituent of at least 4 carbon atoms, and preferably of 8 to 18 carbon atoms, $R^2$ is H or a hydrocarbon substituent of 1 to 18 carbon atoms, $R^3$ is H or a hydrocarbon substituent of 1 to 18 carbon atoms, $R^4$ is H or a hydrocarbon substituent of 1 to 18 carbon atoms, A is an alkylene group of 2 to 4 carbon atoms and preferably ethylene, Y is $-SO_3M$, $-OSO_3M$, $-OPO_3M$, $-PO_3M$, $-COOM$, or $-OCO-R^5-(COOM)_z$, where M is an alkali metal or an alkaline earth metal of Group II, e.g., Be, Mg, Ca, Ba, and Sr, and $R^5$ is an alkyl or aryl radical of 1 to 7 carbon atoms, $m$ is 0 or an integer from 1 to 20 and is preferably at least 7, $n$ is 0 or an integer from 1 to 20 and is preferably at least 7, $x$ is an integer having a value of 1, 2, 3, or more, $y$ is 1 to 5 but is preferably 1.

The compounds of Formula IX include those of U.S. Patent 2,213,477. Formula X includes the compounds of Patents 2,454,542; 2,454,543; 2,454,544; and 2,454,545.

(5) Soluble metal salts of sulfated or sulfonated long-chain aliphatic acid esters, the ester from which the sulfate or sulfonate is derived containing a hydroxyl group or a point of unsaturation either or both of which are subject to reaction with the sulfating or sulfonating reactant. Examples include sulfonation or sulfation products of castor oil, linseed oil, cottonseed oil, and soybean oil.

The water to be purified may, if necessary, be treated with a conventional flocculant to remove suspended insoluble matter before the flocculant composition of the present invention is applied to remove the anionic water-soluble materials. However, this preliminary treatment is not necessary since the flocculant composition of the present invention is capable of removing the insoluble suspended matter as well as the water-soluble material. In this latter situation, the amount of the flocculant composition used may be increased or decreased somewhat relative to the amount needed when no suspended matter is present, the amount of increase or decrease depending on the amount and nature of suspended matter and water-soluble material to be removed by flocculation. Thus, the amount of finely divided inorganic component (1) may range from 0.01 p.p.m. to 1,000 p.p.m., based on weight of solution and the amount of polymer (2) may range from 0.01 p.p.m. to 50,000 p.p.m. based on weight of solution. If a polyvalent metal salt is also used, the amount thereof is generally from 1 p.p.m. to 1,000 p.p.m., based on weight of solution.

In the claims hereinafter, the term "salt" unless specifically qualified is meant to be generic to the simple salts of the polymers with acids and to the quaternary ammonium salts thereof.

To assist those skilled in the art to practice the present invention, the following modes of operation are suggested by way of illustration, parts and percentages being by weight unless otherwise specifically noted.

(1) To a water containing 11 p.p.m. of humic acid there are added 100 p.p.m. of bentonite and 5 p.p.m. of a bisulfate of a 2-vinylimidazoline-2 polymer (obtained by reaction of excess ethylenediamine on a polyacrylonitrile having a molecular weight of about 2 million viscosity average so that the nitrile groups are converted to imidazoline groups). The treated water is allowed to stand one hour with occasional shaking and is then filtered. The filtrate contains only about 0.33 p.p.m. of humic acid.

(2) To a water containing 1.35 p.p.m. of humic acid there are added 5 p.p.m. of bentonite and 0.5 p.p.m. of the same polymer as used in (1) above. After one-hour standing with occasional shaking, the treated water is filtered. The amount of humic acid remaining in the filtrate is negligible.

(3) To a water containing 20 p.p.m. sodium lignin sulfonate there are added 30 p.p.m. of alum, then 15 p.p.m. of bentonite, and then 1 p.p.m. of the same polymer as that used in (1) above. After one hour of standing with occasional shaking, the treated water is filtered. Only 1.74 p.p.m. of sodium lignin sulfonate remains in the filtrate.

(4) To a water at a pH of 2.3 and containing 50 p.p.m. of sodium dodecyl benzene sulfonate there are added 13.75 p.p.m. of the same polymer as that of (1) above. After one hour of standing with occasional shaking, the treated water is filtered. The filtrate contains only 4 p.p.m. of the alkylbenzene sulfonate.

(5) To a water containing 1.25 p.p.m. of fulvic acid there are added 5 p.p.m. bentonite and 0.5 p.p.m. of the same polymer as is used in (1) above. After one hour of standing with occasional shaking, the treated water is filtered. The amount of fulvic acid remaining in the filtrate is only about 0.15 p.p.m.

Note: The treatment of the waters used in (1), (2), (3), (4), and (5) with bentonite alone fails to remove any appreciable amount of the anionic organic content of such waters. Similarly, treatment with alum alone is ineffective.

(6) Each of procedures (1), (2), (3), (4), and (5) are repeated with comparable effective results except that the polymer therein used is replaced by a corresponding amount of the sodium bisulfate salt of a polymer of 2-isopropenyl-imidazoline-2 (obtained by reaction of excess ethylenediamine on a polymethacrylonitrile having a viscosity average molecular weight of about one million so that the nitrile groups are converted to the imidazoline-2 groups).

(7) To a water at a pH of 2.3 and containing 100 p.p.m. of sodium dodecyl benzene sulfonate there are added 27.5 p.p.m. of the same polymer as that of (1) above. After one hour of standing with occasional shaking, the treated water is filtered. The filtrate contains only 10 p.p.m. of the alkylbenzene sulfonate. The same treatment but starting with the water at a pH of 9.7 removes 72% of the anionic detergent.

(8) To a water containing 11 p.p.m. of humic acid there are added 50 p.p.m. of kaolinite and 4 p.p.m. of the same polymer salt as used in (1) above. After standing one hour with occasional shaking and then filtering, 95% of the humic acid is found to have been removed.

(9) Procedure (8) is repeated using diatomaceous earth (Celite) in place of kaolin with similar results.

(10) Procedure (8) is repeated using attapulgite in place of kaolin with similar results.

(11) Procedure (8) is repeated using fuller's earth in place of kaolin with similar results.

(12) Procedure (8) is repeated using montmorillonite in place of kaolin with similar results.

(13) Procedure (8) is repeated using bentonite in place of kaolin with similar results.

(14) Reduction of both the turbidity and detergent content of a river water at a pH of 2.3 containing 7 p.p.m. of sodium dioctyl sulfosuccinate and a turbidity of 20 p.p.m. (SiO$_2$), may be effected by adding thereto first 15 p.p.m. bentonite and then 5 p.p.m. of a water-soluble hydrochloric acid salt of a polymer of 2-vinyl-3,4,5,6-tetrahydropyrimidine (obtained by the reaction of excess trimethylenediamine on a polyacrylonitrile having a viscosity average molecular weight of about 600,000 so that the nitrile groups are converted to tetrahydropyrimidine groups). The suspension is allowed to stand one hour with occasional shaking, and it is then filtered.

(15) Reduction of both the turbidity and detergent content of a river water at a pH of 6 containing 6 p.p.m. of sodium lauryl sulfate and a turbidity of 32 p.p.m. (SiO$_2$), may be effected by adding thereto first 20 p.p.m. kaolinite and then 4 p.p.m. of a water-soluble p-toluene-sulfonic acid salt of a polymer of 2-vinyl-4(or 5)-methyl-2-imidazoline (obtained by the reaction of excess 1,2-diaminopropane on a polyacrylonitrile having a viscosity average molecular weight of about 1.7 million so that the nitrile groups are replaced by substituted imidazoline groups). The suspension is allowed to stand one hour with occasional shaking, and it is then filtered.

(16) Reduction of both the turbidity and detergent content of a river water at a pH of 6 containing 6 p.p.m. of castor oil sulfate and a turbidity of 25 p.p.m. (SiO$_2$), may be effected by adding thereto first 15 p.p.m. diatomaceous earth (Celite) and then 5 p.p.m. of the same polymer salt as used in (1). The suspension is allowed to stand one hour with occasional shaking, and it is then filtered.

(17) Reduction of both the turbidity and detergent content of a river water at a pH of 7.5 and containing 6.5 p.p.m. of magnesium salt of the sulfation product of tert-octyl-phenoxypoly(4)ethoxyethanol and 29 p.p.m. of turbidity (SiO$_2$), may be effected by adding thereto first 15 p.p.m. fuller's earth and then 4 p.p.m. of the same polymer salt as used in (1) above. The suspension is allowed to stand one hour with occasional shaking, and it is then filtered.

(18) Similar results are obtained by repeating procedure (16) with a river water at a pH of 6.5 having a turbidity of 25 p.p.m. (SiO$_2$) and containing 6 p.p.m. of the detergent of Example 1 of U.S. 2,454,542 having the formula

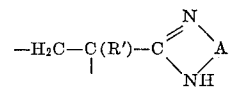

(19) Similar results are obtained by repeating procedure (16) with a river water at a pH of 6.5 having a turbidity of 25 p.p.m. (SiO$_2$) and containing 6 p.p.m. of the detergent of Example 1 of U.S. 2,454,544 having the formula

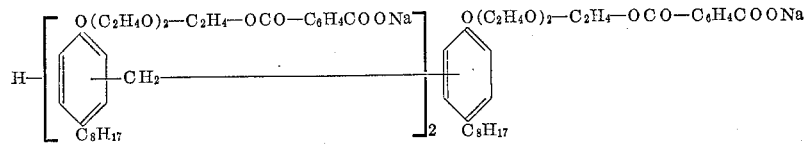

(20) Similar results are obtained by repeating procedure (16) with a river water at a pH of 6.5 having a turbidity of 28 p.p.m. (SiO$_2$) and containing 7 p.p.m. of potassium monomyristyl-toluene-monosulfonate.

(21) Similar results are obtained by repeating procedure (16) with a river water at a pH of 6.5 having a turbidity of 23 p.p.m. (SiO$_2$) and containing 11 p.p.m. of calcium monolauryl-toluene-monosulfonate.

(22) Similar results are obtained by repeating procedure (16) with a river water at a pH of 6.5 having a turbidity of 25 p.p.m. (SiO$_2$) and containing a mixture of anionic sulfonated detergents totalling 8.5 p.p.m.

(23)(a) The methyl bromide quaternary ammonium salt of a polyvinylimidazoline is prepared by dissolving in 250 grams of toluene 95 grams of the free base form of the 2-vinylimidazoline-2 polymer (obtained by reaction of excess ethylene diamine on a polyacrylonitrile having a molecular weight of about three million viscosity average so that the nitrile groups are converted to imidazoline groups such as by the process of Example 1 of Serial No. 254,585 supra) and adding 95 grams of methyl bromide thereto. The mixture is kept at a temperature of about 0 to 5° C. for 48 hours. The mixture is then allowed to reach ambient temperature and is filtered to free the solid quaternary salt from excess solvent.

(b) The procedure of (3) above is repeated except 1.2 p.p.m. of the quaternary salt obtained in part (a) hereof is used in place of the polymer of (1) above. Comparable reduction of the detergent content is obtained.

(c) The procedure of (4) above is repeated except that 15 p.p.m. of the quaternary ammonium salt of part (a) is used in place of the polymer (1) above. Similar results are obtained.

(d) Procedure (14) is repeated with similar results except that the polymer salt there used is replaced with 7 p.p.m. of the quaternary ammonium salt of part (a) hereof.

I claim:
1. A method of treating a water containing an anionic water-soluble material dissolved therein which comprises introducing into the water, from 0.01 p.p.m. to 60,000 p.p.m., based on the water, of a salt of a polymer, having a molecular weight from about 20,000 to 10,000,000 viscosity average and having an exclusively carbon-atom "backbone" chain, containing at least 40 mole percent of units of the formula

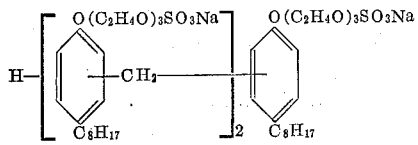

wherein A is a (C$_2$–C$_3$)-alkylene group having at least 2 carbon atoms extending in a chain between the adjoined N atoms, and R' is selected from the group consisting of H and CH$_3$, and then separating the sediment from the water.

2. A method according to claim 1 in which there is also added to the water, 0.01 p.p.m. to about 1,000 p.p.m., based on the water, of an inorganic absorbent material and from 1 p.p.m. to about 1,000 p.p.m. based on the water of a polyvalent metal salt of a strong inorganic acid.

3. A method according to claim 1 in which there is also added to the water, 0.01 p.p.m. to 1,000 p.p.m., based on the water, of an inorganic absorbent material.

4. A method according to claim 3 in which the inorganic material is bentonite.

5. A method according to claim 3 in which the inorganic material is diatomaceous earth.

6. A method of treating a water containing an anionic water-soluble material dissolved therein and also a material imparting turbidity thereto for the purpose of reducing the turbidity and the content of the anionic material therein which comprises introducing into the water in any order
(1) at least about 1 p.p.m., based on the water, of a water-soluble inorganic polyvalent metal salt coagulant,
(2) at least 0.01 p.p.m., based on the water, of a finely divided water-insoluble siliceous material, and
(3) at least 0.01 p.p.m., based on the water, of a salt of a polymer, having a molecular weight from about 20,000 to 10,000,000 viscosity average and having an exclusively carbon-atom "backbone" chain, containing at least 40 mole percent of units of the formula

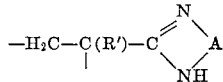

wherein A is a $(C_2-C_3)$-alkylene group having at least 2 carbon atoms extending in a chain between the adjoined N atoms, and R' is selected from the group consisting of H and $CH_3$, and then separating the sediment from the water.

7. A method as defined in claim 6 in which the water-soluble polymer is added after the water-soluble coagulant and before the water-insoluble siliceous material.

8. A method of treating a water containing an anionic water-soluble material dissolved therein which comprises introducing into the water, from 0.01 p.p.m. to 60,000 p.p.m., based on the water, of a salt of a polymer, having a molecular weight from about 20,000 to 10,000,000 viscosity average and having an exclusively carbon-atom "backbone" chain, consisting essentially of units of the formula

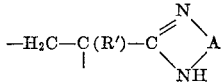

wherein A is a $(C_2-C_3)$-alkylene group having at least 2 carbon atoms extending in a chain between the adjoined N atoms, and R' is selected from the group consisting of H and $CH_3$, and then separating the sediment from the water.

9. A method of treating a water containing an anionic water-soluble material dissolved therein and also a material imparting turbidity thereto for the purpose of reducing the turbidity and the content of the anionic material therein which comprises introducing into the water in any order
 (1) at least about 1 p.p.m., based on the water, of a water-soluble inorganic polyvalent metal salt coagulant,
 (2) at least 0.01 p.p.m., based on the water, of a finely divided water-soluble siliceous material, and
 (3) at least 0.01 p.p.m., based on the water, of a salt of a polymer, having a molecular weight from about 20,000 to 10,000,000 viscosity average and having an exclusively carbon-atom "backbone" chain, the units of which consist essentially of those of the formula

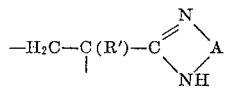

wherein A is a $(C_2-C_3)$-alkylene group having at least 2 carbon atoms extending in a chain between the adjoined N atoms, and R' is selected from the group consisting of H and $CH_3$, and then separating the sediment from the water.

10. A method of treating a water containing an anionic water-soluble material dissolved therein which comprises introducing into the water, from 0.01 p.p.m. to 60,000 p.p.m., based on the water, of a salt of poly(2-vinylimidazoline-2), having a molecular weight from about 20,000 to 10,000,000 viscosity average and having an exclusively carbon-atom "backbone" chain, and then separating the sediment from the water.

11. A method of treating a water containing an anionic water-soluble material dissolved therein which comprises introducing into the water, from 0.01 p.p.m. to 60,000 p.p.m., based on the water, of a salt of poly(2-isopropenyl-imidazoline-2), having a molecular weight from about 20,000 to 10,000,000 viscosity average and having an exclusively carbon-atom "backbone" chain, and then separating the sediment from the water.

12. A method of treating a water containing an anionic water-soluble material dissolved therein which comprises introducing into the water, from 0.01 p.p.m. to 60,000 p.p.m., based on the water, of a salt of poly(2-vinyl-3,4,5,6-tetrahydropyrimidine), having a molecular weight from about 20,000 to 10,000,000 viscosity average and having an exclusively carbon-atom "backbone" chain, and then separating the sediment from the water.

13. A method of treating a water containing an anionic water-soluble material dissolved therein which comprises introducing into the water, from 0.01 p.p.m. to 60,000 p.p.m., based on the water, of a salt of at least one polyimidazoline selected from the group consisting of poly(2-vinyl - 4 - methyl-2-imidazoline) and poly(2-vinyl-5-methyl-2-imidazoline), having a molecular weight from about 20,000 to 10,000,000 viscosity average and having an exclusively carbon-atom "backbone" chain, and then separating the sediment from the water.

No references cited.

MORRIS O. WOLK, *Primary Examiner.*

M. E. ROGERS, *Assistant Examiner.*